United States Patent Office

3,228,984
Patented Jan. 11, 1966

3,228,984
1,4-BIS-CYCLIC AND ARYL-AMINO-[2.2.2]
BICYCLOOCTANE DERIVATIVES
Leslie G. Humber, Montreal, Quebec, Canada, assignor
to American Home Products Corporation, New York,
N.Y., a corporation of Delaware
No Drawing. Filed Nov. 4, 1963, Ser. No. 321,285
12 Claims. (Cl. 260—563)

This invention relates to new derivatives of [2.2.2]bicyclooctane, and to a process for their preparation. More particularly, my invention relates to derivatives of 1,4-bis(aminomethyl)-[2.2.2]bicyclooctane, which new chemical compounds possess valuable pharmacological properties.

This invention also relates to new intermediates in the preparation of said pharmacologically active compounds.

The new pharmacologically active compounds of the present invention, in base form, may be represented by the formula:

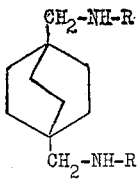

wherein R is a radical selected from the group consisting of 1-indanyl, aralkyl, substituted aralkyl, alkyl, alkenyl, cycloalkyl, cycloalkylalkyl and cycloalkenylalkyl. In base form these compounds posses interesting biological activities, and, being basic in nature, they form tertiary acid addition salts. Such acid addtion salts with pharmacologically acceptable acids are biologically equivalent to the free base, and constitute a preferred form for the administration of the pharmacologically active compounds of my invention.

The new chemical compounds in base form, and their acid addition salts with pharmacologically acceptable acids, are useful both as antibacterial agents and for lowering cholesterol levels in the blood. For example, they will lower cholesterol blood levels in the intact rat by highly significant degrees when administered orally in small doses. They are also effective as antibacterial agents, against both gram positive and gram negative organisms.

As agents for lowering cholesterol levels in blood, the active compounds of this invention may be administered both orally or by injection. For oral administration, the active compounds of this invention, either as the free base or in the form of a pharmacologically acceptable salt, may be formulated in solid dosage forms such as, tablets or capsules, together with carriers such as, e.g., lactose, starch, magnesium stearate, and the like. For administration by injection, the active compounds of this invention are preferably used in the form of one of their pharmaceutically acceptable salts, dissolved in a suitable aqueous vehicle. Both oral dosage forms and dosage forms for injection may be formulated to contain from 5 to 500 mg. of the active ingredient. For administration as antibacterial agents, the active compounds of the invention may be formulated in dosage forms suitable for topical application, for example, in solutions containing from 0.1 to 5.0% of the active ingredient in the form of a water-soluble pharmacologically acceptable salt.

The pharmacologically active products of this invention may be conveniently prepared from the compound of Formula I,

in which A represents CO—Cl or $CH_2$—$NH_2$. When A represents CO—Cl, the compound of Formula I is prepared by the method of Lukes and Langthaler (Coll. Czech. Chem. Comm., 24 2109 (1959). When A represents $CH_2$—$NH_2$, the compound of Formula I may be prepared from either 1,4-dicarboxamido-[2.2.2]-bicyclooctane or 1,4-dicyano-[2.2.2]-bicyclooctane.

Thus, 1,4-dicarboxamido-[2.2.2]bicyclooctane is reduced by reaction with a reducing agent in an inert solvent selected from the group consisting of ethers and cyclic ethers to the corresponding bis(aminomethyl) derivative, 1,4 - bis(aminomethyl)-[2.2.2]bicyclooctane. Preferred reducing agents include lithium aluminum hydride or hydrogen in the presence of a noble metal catalyst. A preferred solvent is tetrahydrofuran. This reduction is effected at a temperature up to the temperature of reflux of the resulting mixture. Alternatively, the biscarboxamide may be dehydrated to the corresponding bisnitrile by conventional means such as, for example, refluxing with thionyl chloride or phosphorus pentachloride. The corresponding bisnitrile may then be reduced to the corresponding bisamine by conventional reducing agents, such as, for example, lithium aluminum hydride, sodium in alcohol or catalytic hydrogenation.

The compound of Formula I is reacted with two molar equivalents of a compound of the Formula B wherein, when A is CO—Cl, B is R'—$NH_2$ with R' representing a member of the group consisting of 1-indanyl, a benzyl group or an ortho-substituted benzyl group wherein the substituents may be halogen or trihalomethyl groups; or R' represents an alkyl, alkenyl, cyclohexyl, cyclohexylmethyl, or cycloalkenylalkyl group.

When A is $CH_2$—$NH_2$, B is $R^2$—CO—$R^3$ wherein $R^3$ is hydrogen when $R^2$ is a phenyl group or an ortho-substituted phenyl group wherein the substituents may be halogen or trihalomethyl groups; or $R^2$ represents an alkyl, alkenyl, cyclohexyl or cycloalkenyl group; or $R^2$ and $R^3$ together may represent an alkylene chain; or $R^2$—CO—$R^3$ represents an indanone moiety.

The above process yields amides or Schiff bases of the Formula II

wherein, when G is CO—NH—, L has the same significance as R' above; and when G is $CH_2$—N=, L may be a benzylidine group or a substituted benzylidine group wherein the substituents may be halogen or trihalomethyl groups; or L represents an alkylidine, alkenylidine, cyclohexylidine, cyclohexylmethylidine or cycloalkenylidine group.

These amides or Schiff bases are then reduced to the corresponding amino compounds. The free base is then recovered by evaporation of the solvent and, if desired, said free base may be transformed into a pharmacologically aceptable acid addition salt thereof by conventional means.

More specifically, the procedure for preparing the new chemical compounds may be described as follows: 1,4-bis-(aminomethyl)-[2.2.2]bicyclooctane is condensed with a suitable benzaldehyde or ortho-substituted benzaldehyde wherein the substituents may be halogen or trihalomethyl; or with an alkylaldehyde, alkenylaldehyde, cycloalkylaldehyde or with a suitable ketone.

The reaction is conducted by bringing the two reactants together at a suitable temperature, preferably and, if necessary, in the presence of an inert solvent. A preferred solvent in this reaction is benzene and a preferred temperature is the temperature of reflux of the resulting reaction mixture. This results in condensation to form the corresponding Schiff base, with elimination of two molecules of water which are conveniently removed, preferably by azeotropic distillation.

The resulting Schiff base is then reduced to the corresponding amino compound. Convenient reducing agents include lithium aluminum hydride in an inert solvent such as ethers or cyclic ethers, sodium borohydride in alcoholic solution and catalytic hydrogenation. This reduction is preferably carried out with sodium borohydride in methanolic solution. The free base is then recovered, preferably by evaporation of the solvent.

Alternatively, [2.2.2] - bicyclooctane - 1,4 - dicarbonyl chloride is caused to react with a suitable indanylamine, benzyl or ortho-substituted benzylamine, wherein the substituents may be a halogen or trihalomethyl group; or with an alkylamine, alkenylamine, cycloalkylamine, cycloalkylalkylamine or cycloalkenylalkylamine, at a suitable temperature and in a suitable inert solvent.

A preferred solvent is benzene and a preferred temperature is that of the refluxing reaction mixture. An excess of the amine or a base such as sodium hydroxide may be used as an acid acceptor to remove the hydrogen halide which is split out in the reaction. This results in condensation to form the corresponding diamide. The resulting diamide is then reduced to the corresponding diamine, the reduction being preferably carried out by reaction in an inert solvent selected from the group consisting of ethers and cyclic ethers to the corresponding diamino compound. Preferred reducing agents include lithium aluminum hydride or hydrogen in the presence of a noble metal catalyst. A preferred solvent is tetrahydrofuran. This reduction is effected at a temperature up to the temperature of reflux of the resulting mixture. The free base is then recovered by evaporation of the solvent.

If a pharmacologically equivalent acid addition salt of the base is desired, this may be prepared by treating the base in the conventional manner with the respective acid. The acid selected will, of course, be a pharmaceutically acceptable acid, for example, a mineral acid such as one of the hydrohalic acids, or an organic acid such as, for example, maleic acid.

Details of the procedure as applied to the preparation of specific chemical compounds within the scope of my invention are given below.

EXAMPLE 1

*1,4-bis(aminomethyl)-[2.2.2]-bicyclooctane*

1,4-dicarboxamido-[2.2.2]-bicyclooctane (6.2 gm.) and lithium aluminum hydride (5.0 gm.) were heated together at the temperature of refluxing tetrahydrofuran for 24 hours. Water (22 ml.) was added cautiously to the cooled reaction mixture and the precipitated salts were removed by filtration. The filtrate was evaporated to yield 1,4-bis(aminomethyl)-[2.2.2]-bicyclooctane as an oil which was characterized by the dihydrochloride salt. It had M.P. 360° C. Analysis confirmed the empirical formula $C_{10}H_{22}N_2Cl_2$.

EXAMPLE 2

*1,4-bis-(o-chlorobenzylaminomethyl)-[2.2.2]-bicyclooctane*

1,4-bis-(aminomethyl)-[2.2.2]-bicyclooctane (4.4 gm.) was heated with o-chlorobenzaldehyde (7.3 gm.) in benzene solution until the theoretical volume of water had been removed by azeotropic distillation. Removal of the benzene yielded the corresponding Schiff base as a semi-solid. It had a strong band in the infra red spectrum at 1640 cm.$^{-1}$. The semi-solid Schiff base (10.7 gm.) was dissolved in methanol and reduced with sodium borohydride (1.9 gm.) by refluxing for four hours. The methanol was removed and the residue distributed between benzene and water. The benzene layer yielded the title product as a solid which was crystallized from a mixture of ether: petroleum ether and had M.P. 82–84° C.

A dihydrochloride salt was prepared with ethereal hydrogen chloride. It was crystallized from ethanol and had M.P. 289.5–290° C. Analysis confirmed the empirical formula $C_{14}H_{32}N_2Cl_4$.

EXAMPLE 3

*1,4-bis-(aminomethyl)-[2.2.2]-bicyclooctane*

1,4-dicyano-[2.2.2]-bicyclooctane (prepared by the method of Lukes and Langthaler), (5.2 gm.), was added to a solution of lithium aluminum hydride (5.0 gm.) in tetrahydrofuran (150 ml.) and refluxed for 18 hours. Water (20 ml.) was added, the inorganic salts separated by filtration and the filtrate evaporated to yield the title compound B.P. 90° C. (0.02 mm.), identical to that described above in Example I.

EXAMPLE 4

*1,4-bis-(o-trifluoromethylbenzylaminomethyl)-[2.2.2]-bicyclooctane*

By using the process of Example 2, 1,4-bis-(aminomethyl)-[2.2.2]-bicyclooctane (840 mg.) and o-trifluoromethylbenzaldehyde (1.74 gm.) (prepared by reduction of the correpsonding acid chloride with lithium tri(tertiarybutoxy)-aluminum hydride) were converted to the corresponding Schiff base, $\nu_{max.}$ 1643 cm.$^{-1}$, which was reduced with sodium borohydride (4.0 gm.) as described in Example 2, to yield the title product as a light yellow oil, $\lambda_{max.}$ 265 m$\mu$ ($\epsilon$=2030), 272 m$\mu$ ($\epsilon$=1710). The dihydrochloride salt was prepared by standard procedures. On crystallization from a methanol-ether mixture, it had M.P. 284–287° C. and its empirical formula $$C_{26}H_{32}Cl_2F_6N_2$$

was confirmed by analysis.

EXAMPLE 5

*1,4-bis-(cyclohexylaminomethyl)-[2.2.2]-bicyclooctane*

By using the process of Example 2 1,4-bis-(aminomethyl)-[2.2.2]-bicyclooctane (1.54 gm.) and cyclohexanone (1.8 gm.) were converted to the corresponding Schiff base, $\nu_{max}$ 1650 cm.$^{-1}$, which was reduced with sodium borohydride (4.0 gm.) as described in Example 2, to yield the title product as an oil, $\nu_{max}$ 895 cm.$^{-1}$, 1105 cm.$^{-1}$, and 1500 cm.$^{-1}$.

The dihydrochloride salt was prepared and crystallized from a methanol-ether mixture. Its melting point was in excess of 310° C. and its empirical formula $C_{22}H_{42}Cl_2N_2$ was confirmed by analysis.

EXAMPLE 6

N,N'-dicyclohexylmethyl-[2.2.2]-bicyclooctane-1,4-dicarboxamide

[2.2.2] - bicyclooctane - 1,4 - dicarbonylchloride (7.05 gm.) (prepared according to Lukes and Langthaler, Coll. Czech. Chem. Comm., vol. 24, 1959, page 2109) was added slowly to a solution of cyclohexylmethylamine (13.5 gm.) (prepared by catalytic hydrogenation of benzylamine) in benzene (100 ml.). The mixture was refluxed for 20 mins. and the solvent was removed in vacuo. The residue was washed with water and crystallized from methanol to yield the title compound, M.P. 248–250° C., empirical formula $C_{24}H_{40}N_2O_2$ confirmed by analysis.

EXAMPLE 7

N,N-di-(d,l-1-indanyl)-[2.2.2]-bicyclooctane-1,4-dicarboxamide

By using the process of Example 6, [2.2.2]-bicyclooctane-1,4-dicarbonyl chloride (3.52 gm.) and d,l-1-aminoindane (8.0 gm.) were reacted together to yield the title compound which, on crystallization from methanol, had M.P. 250.252° C. The empirical formula $C_{28}H_{32}N_2O_2$ was confirmed by analysis.

EXAMPLE 8

1,4-bis-(cyclohexylmethylaminomethyl)-[2.2.2]-bicyclooctane

The diamide of Example 6 (9.8 gm.) and lithium aluminum hydride (10 gm.) were refluxed in tetrahydrofuran (500 ml.) for 24 hours. After addition of water (45 ml.), the inorganic salts were filtered off and the filtrate evaporated in vacuo to yield the diamine of the title, $\nu_{max}$. 1505 cm.$^{-1}$, 2860 cm.$^{-1}$, and 2940 cm.$^{-1}$. The dihydrochloride salt was prepared and crystallized from ethanol. It had a melting point in excess of 310° C. and its empirical formula $C_{24}H_{46}Cl_2N_2$ was confirmed by analysis.

EXAMPLE 9

1,4-bis-(d,l-1-indanylaminomethyl)-[2.2.2]-bicyclooctane

By using the process of Example 8, the diamide of Example 7 (6.1 gm.) was reduced with lithium aluminum hydride (10.0 gm.) in tetrahydrofuran (250 ml.). The reaction mixture was worked up as described in Example 8 to yield the title compound, $\lambda_{max}$. 266 m$\mu$ ($\epsilon$=1930), 272 m$\mu$ ($\epsilon$=2170), 259 m$\mu$ ($\epsilon$=1270).

The dihydrochloride salt had M.P. 308–310° C. and its empirical formula $C_{28}H_{38}Cl_2N_2$ was confirmed by analysis.

I claim:
1. A compound selected from the group which consists of compounds of the formula:

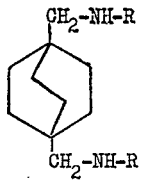

wherein R is a radical selected from the group consisting of 1-indanyl, benzyl, o-chlorobenzyl, o-trifluoromethylbenzyl, cyclohexyl and cyclohexylmethyl; and acid addition salts thereof with pharmacologically acceptable acids.

2. A compound of the formula:

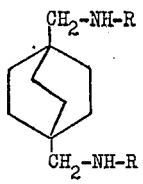

wherein R is a radical selected from the group consisting of 1-indanyl, benzyl, o-chlorobenzyl, o-trifluoromethylbenzyl, cyclohexyl and cyclohexylmethyl.

3. 1,4 - bis-(o-chlorobenzylaminomethyl) - [2.2.2]-bicyclooctane.

4. 1,4 - bis - (o - trifluoromethylbenzylaminomethyl)-[2.2.2]-bicyclooctane.

5. 1,4 - bis - (cyclohexylaminomethyl) - [2.2.2] - bicyclooctane.

6. 1,4 - bis - (cyclohexylmethylaminomethyl) - [2.2.2]-bicyclooctane.

7. 1,4 - bis - (d,l-1-indanylaminomethyl) - [2.2.2]-bicyclooctane.

8. The dihydrochloride salt of 1,4-bis-(o-chlorobenzylaminomethyl)-[2.2.2]-bicyclooctane.

9. The dihydrochloride salt of 1,4-bis-(o-trifluoromethylbenzylaminomethyl)-[2.2.2]-bicyclooctane.

10. The dihydrochloride salt of 1,4-bis-(cyclohexylaminomethyl)-[2.2.2]-bicyclooctane.

11. The dihydrochloride salt of 1,4-bis-(cyclohexylmethylaminomethyl)-[2.2.2]-bicyclooctane.

12. The dihydrochloride salt of 1,4-bis-(d,l-1-indanylaminomethyl)-[2.2.2]-bicyclooctane.

References Cited by the Examiner

Scheiner et al.: "Journal of Organic Chemistry," vol. 26, pages 1923–5 (1961).

Takeda et al.: "Chemical Abstracts," vol. 55, pages 508–510 (1961).

CHARLES B. PARKER, *Primary Examiner.*

ROBERT V. HINES, *Assistant Examiner.*